US007171924B2

(12) United States Patent
Robel et al.

(10) Patent No.: US 7,171,924 B2
(45) Date of Patent: Feb. 6, 2007

(54) COMBUSTION CONTROL SYSTEM OF A HOMOGENEOUS CHARGE

(75) Inventors: Wade James Robel, Normal, IL (US); Scott B. Fiveland, East Norwich, NY (US); Joel D. Hiltner, Farmington, ME (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/902,287

(22) Filed: Jul. 30, 2004

(65) Prior Publication Data

US 2006/0021587 A1 Feb. 2, 2006

(51) Int. Cl.
*F02B 41/00* (2006.01)
*F00B 3/00* (2006.01)

(52) U.S. Cl. ...................................... 123/26; 123/27 R
(58) Field of Classification Search ................ 123/274, 123/275, 26, 27 R, 432, 143 B, 143 R, 25 P, 123/568.13
See application file for complete search history.

(56) References Cited

U.S. PATENT DOCUMENTS

| | | | | |
|---|---|---|---|---|
| 3,019,777 | A | * | 2/1962 | Candelise ..................... 123/26 |
| 3,073,289 | A | * | 1/1963 | Candelise ..................... 123/26 |
| 3,650,261 | A | * | 3/1972 | Hutsell ................ 123/198 DB |
| 3,842,808 | A | * | 10/1974 | Cataldo ..................... 123/25 P |
| 4,023,541 | A | * | 5/1977 | Sakamoto et al. ............. 123/26 |
| 4,061,113 | A | * | 12/1977 | Beyler .......................... 123/26 |
| 4,067,301 | A | * | 1/1978 | Jarry ........................... 123/26 |
| 4,203,393 | A | | 5/1980 | Giardini |
| 4,306,526 | A | | 12/1981 | Schaub et al. |
| 4,498,429 | A | * | 2/1985 | Satow et al. ................... 123/26 |
| 4,552,106 | A | * | 11/1985 | Spence ................... 123/198 A |
| 4,554,890 | A | * | 11/1985 | Okimoto et al. .............. 123/26 |
| 4,558,670 | A | * | 12/1985 | Trihey ......................... 123/308 |
| 4,625,693 | A | * | 12/1986 | Trihey ......................... 123/432 |
| 4,766,855 | A | | 8/1988 | Tozzi |
| 5,211,142 | A | | 5/1993 | Matthews et al. |
| 5,271,365 | A | | 12/1993 | Oppenheim et al. |
| 6,032,617 | A | * | 3/2000 | Willi et al. ............. 123/27 GE |
| 6,298,825 | B1 | | 10/2001 | Hupperich et al. |
| 6,374,799 | B1 | | 4/2002 | Firey |
| 6,427,660 | B1 | | 8/2002 | Yang |
| 6,571,770 | B1 | * | 6/2003 | Codan et al. ................ 123/432 |
| 6,640,773 | B2 | | 11/2003 | Ancimer et al. |
| 2003/0221661 | A1 | | 12/2003 | Willi et al. |

* cited by examiner

*Primary Examiner*—John T. Kwon
(74) *Attorney, Agent, or Firm*—Finnegan, Henderson, Farabow, Garrett & Dunner

(57) ABSTRACT

An internal combustion engine has at least one combustion chamber and a piston slidably disposed within the at least one combustion chamber. The piston is configured to reciprocate between a top-dead-center position and a bottom-dead-center position. The internal combustion engine also has an air supply in selective fluid communication with the at least one combustion chamber and a fuel supply in selective fluid communication with the at least one combustion chamber. The internal combustion engine further has a supply of non-combustible gas and at least one injector in fluid communication with the at least one combustion chamber and the supply of non-combustible gas. The at least one injector is configured to inject non-combustible gas from the supply into the at least one combustion chamber.

38 Claims, 3 Drawing Sheets

COMBUSTION CONTROL SYSTEM OF A HOMOGENEOUS CHARGE

TECHNICAL FIELD

The present disclosure relates generally to a combustion control system and, more particularly, to a combustion control system of a homogeneous charge.

BACKGROUND

Internal combustion engines, including diesel engines, gasoline engines, natural gas engines, and other engines known in the art, may exhaust a complex mixture of air pollutants. The air pollutants may be composed of gaseous compounds, which may include nitrous oxides (NOx).

Due to increased attention on the environment, exhaust emission standards have become more stringent, and the amount of NOx emitted to the atmosphere from an engine may be regulated depending on the type of engine, size of engine, and/or class of engine. One method that has been implemented by engine manufacturers to comply with the regulation of these engine emissions has been to develop homogeneous charge compression ignition (HCCI) engines that burn compressed natural gas (CNG).

HCCI combustion takes place spontaneously and homogeneously without flame propagation. In the HCCI engine, fuel is homogeneously premixed with air, but with a high ratio of air to fuel. When the piston nears top dead center (TDC) of the compression stroke, compression heating of the piston within the cylinder causes this mixture to auto-ignite (spontaneously combust). The homogeneous CNG/air mixture combined with a lean-burn process produces a lower local flame temperature, which lowers the amount of NOx production.

One problem associated with HCCI engines includes control of combustion timing. In particular, specific quantities of fuel and air in the combustion chamber must be precisely maintained in order to ensure auto-ignition at an intended timing. This need for precision leads to transient control problems, requiring the system to ascertain initial cylinder conditions and then to estimate temperature later in the cycle based on measured cylinder pressures. High cost instrumentation and computing power may be required to perform these high-speed complex processes.

As disclosed in U.S. Pat. No. 6,640,773 (the '773 patent), issued to Ancimer et al. on Nov. 4, 2003, combustion control of the homogeneous CNG/air mixture may be accomplished with a dual-fuel system. The '773 patent describes introducing a gaseous main fuel (CNG, propane, bio-gas, landfill gas, or hydrogen gas) and air into the cylinder to form a substantially homogeneous mixture prior to combustion. The '773 patent further describes introducing a pilot fuel (diesel fuel or dimethylether) that ignites more readily than the main fuel into the cylinder near top-dead-center (TDC) of the compression stroke. Upon auto-ignition of the pilot fuel, the temperature and pressure of the main fuel rapidly increase to cause auto-ignition of the main fuel. In this manner, injection of the pilot fuel controls auto-ignition timing of the main fuel.

Although the apparatus of the '773 patent may improve control over combustion timing of an HCCI engine, the apparatus requires two separate fuel systems, one for the main fuel and one for the pilot fuel. The two separate fuel systems may increase the cost and complexity of the HCCI engine. In addition, the benefits of using the low NOx-producing main fuel may be diluted by using the higher NOx-producing pilot fuel.

The disclosed homogeneous charge combustion control system is directed to overcoming one or more of the problems set forth above.

SUMMARY OF THE INVENTION

In one aspect, the present disclosure is directed to an internal combustion engine that includes at least one combustion chamber and a piston slidably disposed within the at least one combustion chamber. The piston is configured to reciprocate between a top-dead-center position and a bottom-dead-center position. The internal combustion engine also includes an air supply in selective fluid communication with the at least one combustion chamber and a fuel supply in selective fluid communication with the at least one combustion chamber. The internal combustion engine further includes a supply of non-combustible gas and at least one injector in fluid communication with the at least one combustion chamber and the supply of non-combustible gas. The at least one injector is configured to inject non-combustible gas from the supply into the at least one combustion chamber.

In another aspect, the present disclosure is directed to a method of operating an internal combustion engine. The method includes introducing a quantity of fuel and air into at least one combustion chamber of the internal combustion engine and moving a piston between a bottom-dead-center position and a top-dead-center position to compress the quantity of fuel and air. The method further includes injecting a quantity of non-combustible gas to cause auto-ignition of the quantity of fuel and air.

DETAILED DESCRIPTION

Figure 1:
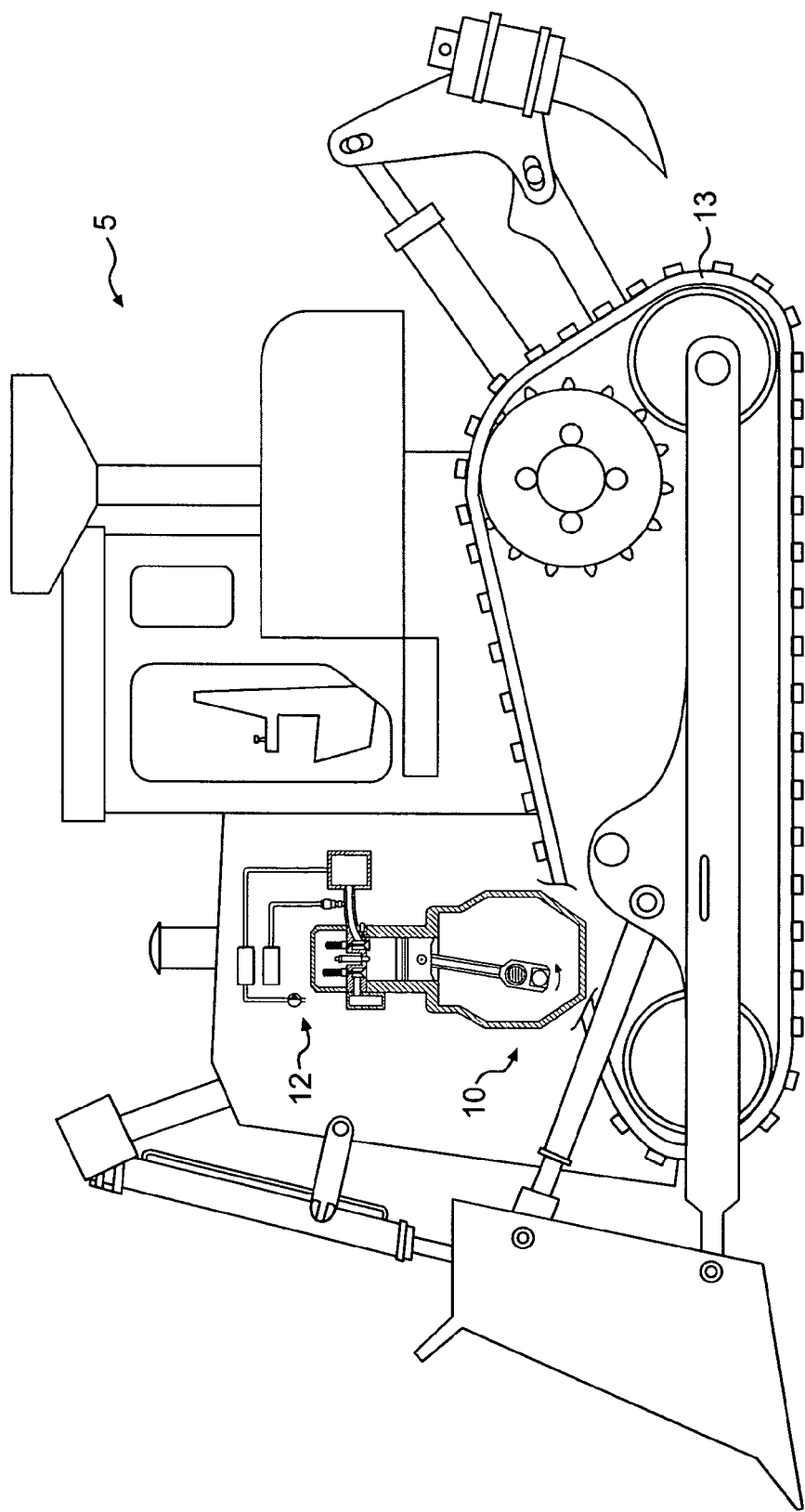
FIG. 1 is a diagrammatic illustration of a work machine having a homogeneous charge compression ignition engine and a combustion control system according to an exemplary disclosed embodiment.

FIG. 1 illustrates a work machine 5 having an exemplary homogeneous charge compression ignition engine (HCCIE) 10 and a combustion control system (CCS) 12. Work machine 5 may be a fixed or mobile machine having a traction device 13. Work machine 5 may performs some type of operation associated with an industry such as mining, construction, farming, or any other industry known in the art. For example, work machine 5 may be an earth moving machine such as a dozer, a loader, a backhoe, an excavator, a motor grader, a dump truck, or any other earth moving machine. Work machine 5 may also include a generator set, a pump, a marine vessel, an aircraft, or any other suitable operation-performing work machine.

Figure 2:
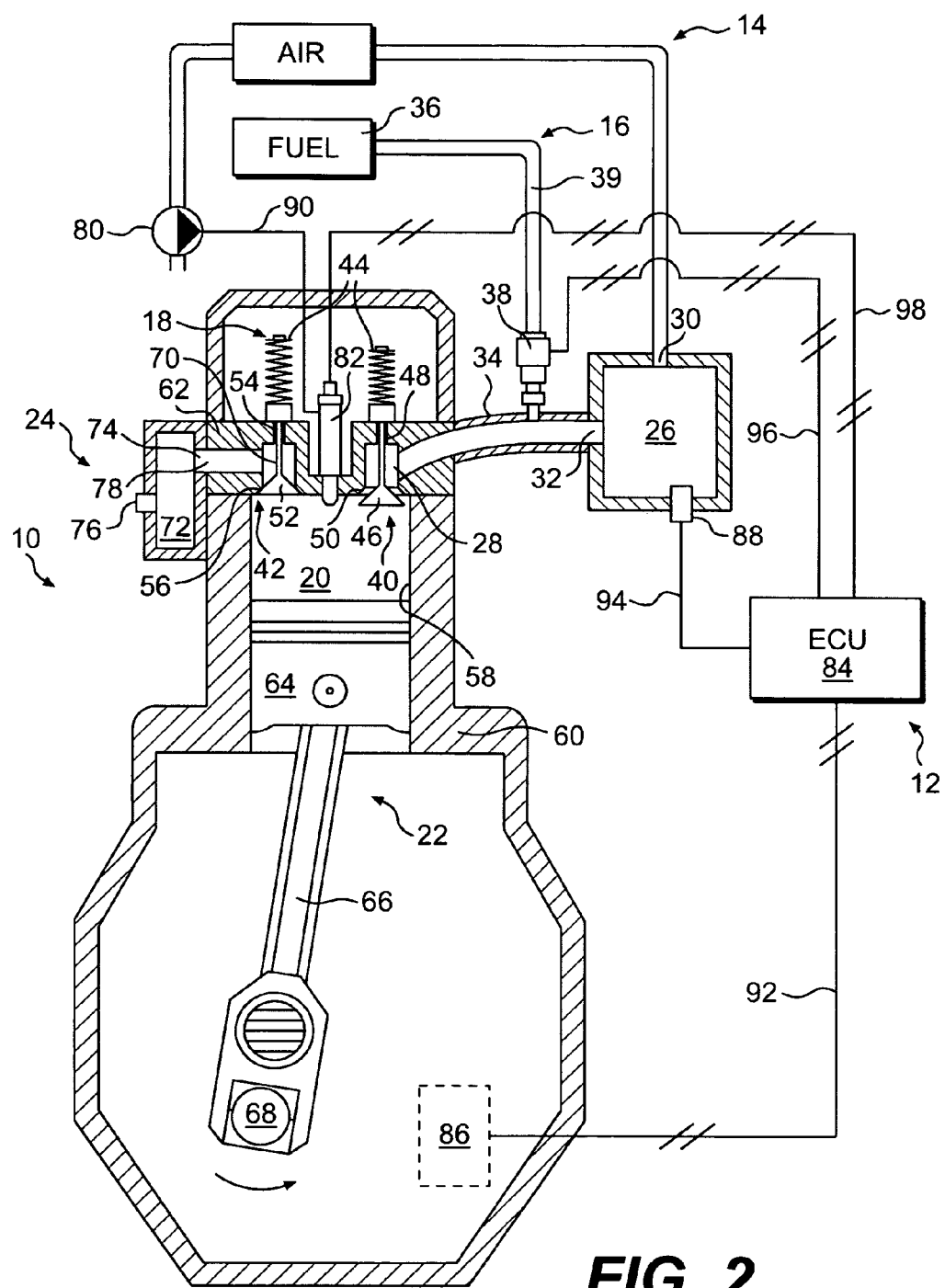
FIG. 2 is a diagrammatic and schematic illustration of a homogeneous charge compression ignition engine having a combustion control system according to an exemplary disclosed embodiment.

HCCIE 10 may be configured to compress a substantially homogeneous mixture of fuel and air, which is then controllably auto-ignited to produce mechanical work and exhaust. As illustrated in FIG. 2, HCCIE 10 may include an air induction system 14, a fuel system 16, a valve actuation system 18, a plurality of combustion chambers 20 (only one shown), a piston assembly 22 disposed within each of combustion chambers 20, and an exhaust system 24.

Air induction system 14 may be configured to draw air into HCCIE 10 and may include an intake manifold 26 and an inlet port 28. It is contemplated that air induction system 14 may be a charged air system having a turbine-driven or engine-driven compressor (not shown), or may include additional air handling components such as, for example, a waste gate, a throttle, an EGR system, an air cleaner, an air cooler, or any other air handling component known in the art.

Intake manifold 26 may be configured to distribute air to each of combustion chambers 20 and may include an inlet 30 and an outlet 32. It is contemplated that multiple intake manifolds 26 may be included within HCCIE 10, each intake manifold 26 distributing air to separate banks of combustion chambers 20.

Inlet port 28 may be connected to intake manifold 26 via a fluid passageway 34 and configured to fluidly communicate the air from intake manifold 26 with valve actuation system 18 associated with each combustion chamber 20. It is contemplated that multiple inlet ports 28 may be associated with each combustion chamber 20.

Fuel system 16 may be configured to supply fuel to HCCEI 10 and may include a source of pressurized fuel 36 and a valve 38. It is contemplated that additional components may be included such as for example, a common fuel rail configured to distribute fuel to multiple valves 38, a fuel injector, a pre-combustion chamber, or any other fuel system component known in the art.

The source of pressurized fuel 36 may include a compressed gaseous fuel such as, for example, natural gas, propane, bio-gas, landfill gas, or hydrogen gas. It is also contemplated that the source of pressurized fuel 36 may be a pump configured to pressurize a liquid fuel such as, for example, gasoline, methanol, ethanol, or any other gaseous or liquid fuel having a substantially high octane number and a substantially low cetane number.

Valve 38 may be connected to the source of pressurized fuel 36 via a fluid passageway 39 and to fluid passageway 34 to control the amount of fuel communicated from the source of pressurized fuel to fluid passageway 34. Valve 38 may be a spool valve, a shutter valve, a butterfly valve, a check valve, a diaphragm valve, a gate valve, a shuttle valve, a ball valve, a globe valve, or any other valve known in the art. Valve 38 may be solenoid-actuated hydraulically-actuated, pneumatically-actuated, or actuated in any other manner. In particular, valve 38 may be movable between a first position where fuel flows into fluid passageway 34 and a second position where fuel is blocked from fluid passageway 34.

The amount of fuel allowed into fluid passageway 34 by valve 38 controls the ratio of fuel to air introduced into combustion chamber 20. Specifically, if it is desired to introduce a lean mixture of fuel and air (mixture having a relatively low amount of fuel compared to the amount of air) into combustion chamber 20, valve 38 may remain in the first position for a shorter period of time than if a rich mixture of fuel and air (mixture having a relatively large amount of fuel compared to the amount of air) is desired. Likewise, if a rich mixture of fuel and air is desired, valve 38 may remain in the first position for a longer period of time than if a lean mixture is desired. It is contemplated that valve 38 may be omitted, if desired, and a fuel injector included.

Valve actuation system 18 may be configured to meter fuel and air into and allow exhaust out of combustion chamber 20 and may include at least one intake valve 40, at least one exhaust valve 42, and a return spring 44 associated with each of intake valve 40 and exhaust valve 42. Additional components may be included within valve actuation system 18 such as, for example, a valve actuator (not shown), additional intake valves 40 associated with each combustion chamber 20, additional exhaust valves 42 associated with each combustion chamber 20, a bridge interconnecting the intake valves 40 or exhaust valves 42 of each combustion chamber, and other components known in the art. The valve actuator may embody any means for actuating intake valve 40 or exhaust valve 42 such as, for example, a cam/push-rod/rocker arm assembly, a solenoid actuator, a hydraulic actuator, or any other means for actuating known in the art.

Intake valve 40 may selectively fluidly communicate inlet port 28 with combustion chamber 20 and may include a valve member 46, a stem 48 connecting valve member 46 to the valve actuator, and a seat 50. In particular, valve member 46 may be movable between a first position where fuel and air flows into combustion chamber 20 and a second position where valve member 46 engages seat 50 to block fuel and air from combustion chamber 20.

Exhaust valve 42 may selectively fluidly communication exhaust system 24 with combustion chamber 20 to selectively allow exhaust to flow from combustion chamber 20 into exhaust system 24, and may include a valve member 52, a stem 54 connecting valve member 52 to the valve actuator, and a seat 56. In particular, valve member 52 may be movable between a first position where the exhaust flows out of combustion chamber 20 and a second position where valve member 52 engages seat 56 to block exhaust from exiting combustion chamber 20.

Return spring 44 may be configured to bias intake and exhaust valves 40, 42 toward their respective second positions. In particular, return spring 44 may be operably connected to each of intake valves 40 and exhaust valves 42 by means of a retaining member (not shown) connected to stems 48 and 54. As intake or exhaust valves 40, 42 move toward their first position, return spring 44 may compress against a surface of combustion chamber 20 and urge the respective valve to the second position. It is contemplated that different return springs may be implemented for intake valve 40 as compared to exhaust valve 42. It is further contemplated that return spring 44 may be omitted, if desired, and another means may be implemented for biasing intake valve 40 and exhaust valve 42 to the second position.

Combustion chamber 20 may be configured to receive fuel and air from fuel system 16 and air induction system 14, to house the combustion process, and to direct exhaust resulting from the combustion process to exhaust system 24. Combustion chamber 20 may include a cylinder bore 58 formed within an engine block 60, and a cylinder head 62 connected to engine block 60. It is contemplated that additional components may be included within combustion chamber 20 such as, for example, a cooling chamber (not shown) disposed between cylinder bore 58 and engine block 60, a cylinder liner (not shown) disposed within cylinder bore 58, a means (not shown) for sealing cylinder head 62 to engine block 60, and other combustion chamber components known in the art.

Piston assembly 22 may be slidably disposed with cylinder bore 58 and configured to reciprocate between a bottomdead-center (BDC) position, or lower-most position within combustion chamber 20, and a top-dead-center (TDC) position, or upper-most position within combustion chamber 20. In particular, piston assembly 22 may include a piston 64 and a connecting rod 66 that connects piston assembly 22 to a crankshaft 68 of HCCIE 10. As crankshaft 68 rotates 180 degrees, piston 64 and linked connecting rod 66 move through one full stroke between BDC and TDC. HCCIE 10 may be a four stroke engine, wherein a complete cycle includes an intake stroke (TDC to BDC), a compression stroke (BDC to TDC), a power stroke (TDC to BDC), and an exhaust stroke (BDC to TDC). It is also contemplated that HCCIE 10 may alternately be a two stroke engine, wherein a complete cycle includes a compression/exhaust stroke (BDC to TDC) and a power/exhaust/intake stroke (TDC to BDC).

Exhaust system 24 may be configured to direct exhaust from combustion chamber 20 to the atmosphere and may include an exhaust port 70 and an exhaust manifold 72. It is contemplated that exhaust system 24 may include other components such as, for example, a turbine, an exhaust gas recirculation system, a particulate filter, a catalytic aftertreatment system, or any other exhaust system component known in the art.

Exhaust manifold 72 may be configured to collect exhaust from each of combustion chambers 20 and to direct the exhaust to the atmosphere. Exhaust manifold 72 may include an inlet 74 and an outlet 76. It is contemplated that multiple exhaust manifolds 72 may be included within HCCIE 10, each exhaust manifold 72 collecting exhaust from separate banks of combustion chambers 20.

Exhaust port 70 may be connected to exhaust manifold 72 via a fluid passageway 78 and configured to fluidly communicate the exhaust from exhaust valve 42, associated with each combustion chamber 20, with exhaust manifold 72. It is contemplated that multiple exhaust ports 70 may be associated with each combustion chamber 20.

CCS 12 may be configured to control combustion timing of a substantially homogeneous mixture of fuel and air compressed by HCCIE 10 and may include a source of pressurized gas 80, an injector 82, an electronic control unit (ECU) 84, a crank angle sensor 86, and a intake manifold sensor 88. It is contemplated that additional components may be included within CCS 12 such as, for example, additional engine sensors.

The source of pressurized gas 80 may be configured to pressurize a supply (not shown) of gas and direct the pressurized gas to injector 82 via fluid passageway 90. The source of pressurized gas 80 may include any means for pressurizing a gaseous fluid such as, for example, a fixed or variable displacement rotary piston pump, a diaphragm pump, or any other pump known in the art. The supply of gas may include any non-combustible gas such as, for example, air, oxygen or nitrogen enriched air, $CO_2$, recirculated exhaust from HCCIE 10, or any other non-combustible gas known in the art. The non-combustible gas may be compressed, for example, to about 2000 psi prior to injection into combustion chamber 20. It is contemplated that if HCCIE 10 includes a turbo-charged air induction system, air compressed by the compressor of the turbocharger may be routed into the source of pressurized gas 80 to increase the efficiency of CCS 12. During the pressurizing process, the temperature of the non-combustible gas rises proportionally to the rise in pressure and may reach temperatures, for example, of about 1000° C. It is also contemplated that a means for heating the non-combustible gas may also be included.

Injector 82 may be configured to selectively inject a quantity of the pressurized non-combustible gas into combustion chamber 20. In particular, injector 82 may move between a first position where the pressurized non-combustible gas flows into combustion chamber 20 and a second position where the pressurized non-combustible gas is blocked from combustion chamber 20. It is contemplated that the source of pressurized gas 80 may be omitted, if desired, and injector 82 caused to pressurize the non-combustible gas during injection into combustion chamber 20.

ECU 84 may be in communication with crank angle sensor 86 via communication line 92, with intake manifold sensor 88 via communication line 94, with valve 38 via communication line 96, and with injector 82 via communication line 98 to separately control operations of valve 38 and injector 82 in response to signals from crank angle sensor 86 and intake manifold sensor 88. Crank angle sensor 86 may be disposed proximal to crankshaft 68 and configured to measure an instantaneous angular position of crankshaft 68 and to generate a signal corresponding to the measured crank angle. Intake manifold sensor 88 may be disposed within intake manifold 26 and configured to measure an instantaneous pressure and/or temperature within intake manifold 26 and to generate a pressure signal and/or a temperature signal in response thereto. It is contemplated that a greater or lesser number of sensors may be included within CCS 12 and that intake manifold sensor 88 may be omitted, if desired. It is further contemplated that intake manifold sensor 88 may alternately be located within combustion chamber 20 to measure a pressure and/or temperature of the fluid within combustion chamber 20.

Figure 3:
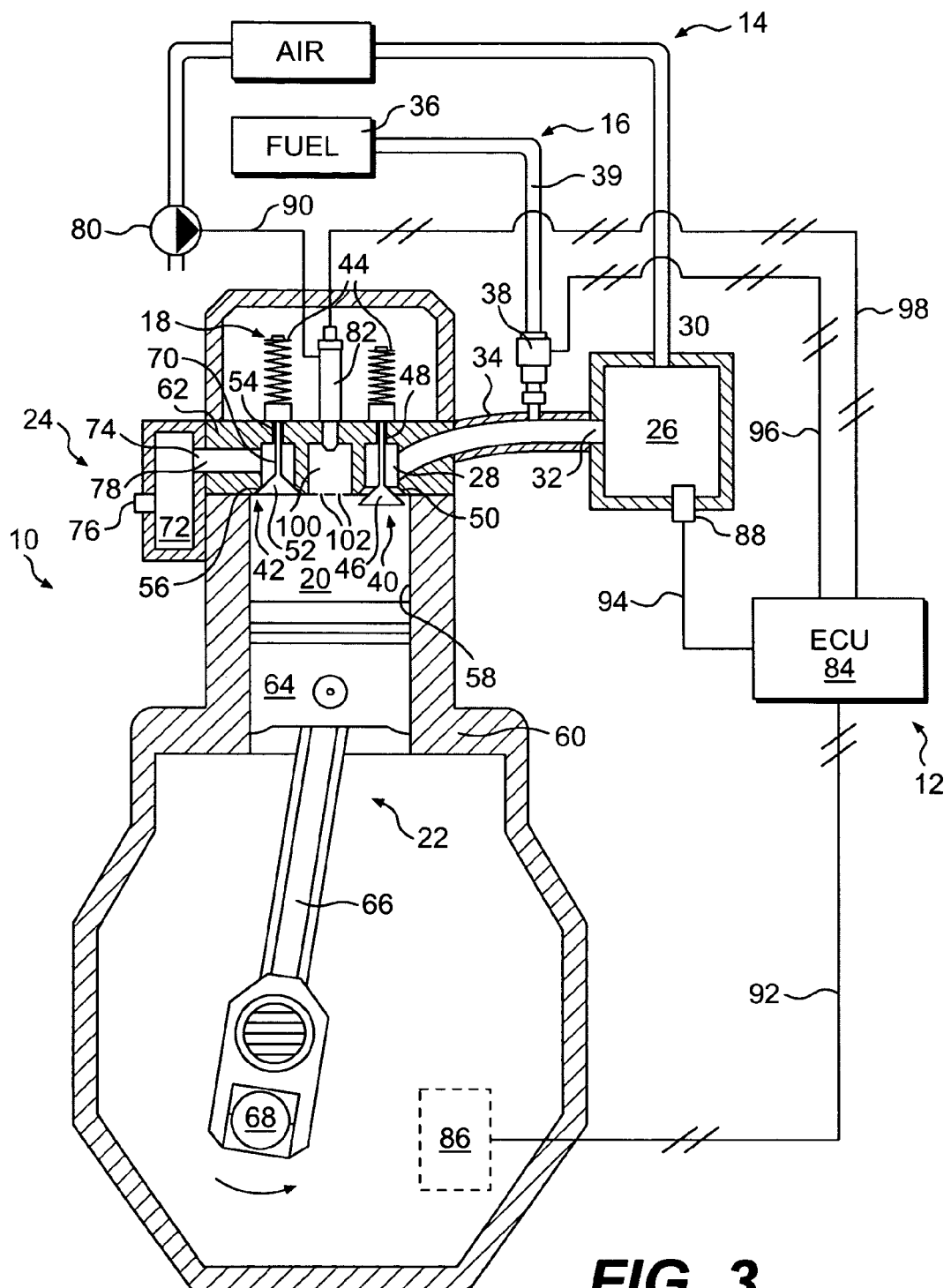
FIG. 3 is a diagrammatic and schematic illustration of a homogeneous charge compression ignition engine having a combustion control system according to an exemplary disclosed embodiment.

FIG. 3 illustrates an alternate embodiment of HCCIE 10. In contrast to FIG. 2, HCCIE 10 of FIG. 3 includes a pre-combustion chamber 100 having orifices 102. Pre-combustion chamber 100 may be in fluid communication with combustion chamber 20 via orifices 102 and exposed to the same mixture of fuel and air that is present in combustion chamber 20. It is contemplated that any number of orifices 102 may be included within pre-combustion chamber 100. In this embodiment, injector 82 may be disposed such that an injection from injector 82 is directed into pre-combustion chamber 100 instead of combustion chamber 20.

INDUSTRIAL APPLICABILITY

The disclosed combustion control system may be applicable to any homogeneous charge compression ignition engine where precise control over combustion initiation is desired. The operation of CCS 12 associated with HCCIE 10 will now be explained.

During an intake stroke of HCCIE 10, as piston 64 is moving within combustion chamber 20 between the TDC position and the BDC position, intake valve 40 may be in the first position, as shown in FIG. 1. During the intake stroke, the downward movement of piston 64 towards the BDC position may create a low pressure within combustion chamber 20. The low pressure may act to draw fuel and air from fluid passageway 34 into combustion chamber 20 via inlet port 28. As described above, a turbocharger may alternately be used to force compressed air and fuel into combustion chamber 20. The fuel may be introduced into the air stream either from or to the turbo charger or, alternately, may be injected directly into combustion chamber 20.

Following the intake stroke, both intake valve 40 and exhaust valve 42 may be in the second position where the fuel and air mixture are blocked from exiting combustion chamber 20 during the upward compression stroke of piston 64. As the piston moves upward from the BDC position towards the TDC position during the compression stroke, the fuel and air mixture within combustion chamber 20 may be homogeneously mixed and compressed. At a time during the compression stroke or, alternately, just after completion of the compression stroke, the pressurized non-combustible gas may be injected into combustion chamber 20. The injection of the pressurized non-combustible gas may increase the pressure and/or temperature of the homogenous fuel and air mixture within combustion chamber 20 above the auto-ignition threshold of the homogeneous fuel and air mixture. Injection may occur such that auto-ignition is established just after TDC when piston 64 is moving downward during the power stroke. It is contemplated that auto-ignition may occur just prior to TDC when piston 64 is completing the compression stroke. It is also contemplated that an additional injection of the non-combustible gas may be directed into combustion chamber 20 during either the intake stroke or the exhaust stroke to increase swirling, thereby improving mixing of the fuel and air.

In the alternate embodiment of FIG. 3, at the time during the compression stroke or just after completion of the compression stroke, injector 82 may inject the pressurized non-combustible gas into pre-combustion chamber 100 rather than directly into combustion chamber 20. Because pre-combustion chamber 100 is fluidly communicated with the same homogeneous mixture as combustion chamber 20 via orifices 102, the injection of non-combustible gas causes auto-ignition of the mixture within pre-combustion chamber 100. As the mixture within pre-combustion chamber 100 ignites, the combustion process occurring within pre-combustion chamber 100 extends into combustion chamber 20 via orifices 102 to raise the temperature and pressure of the mixture within combustion chamber 20 above the auto-ignition threshold of the mixture within combustion chamber 20. In this manner, injection within pre-combustion chamber 100 causes auto-ignition of the fuel and air mixture within combustion chamber 20. Because the volume of pre-combustion chamber 100 is smaller than the volume of combustion chamber 20, the injection amount of non-combustible gas into pre-combustion chamber 100 required to cause auto-ignition of the homogeneous mixture may be less than when injection occurs directly into combustion chamber 20.

The fuel to air ratio of the mixture within combustion chamber 20 and the timing of the non-combustible gas injection may be controlled by CCS 12. In particular, ECU 84 may move valve 38 between the first and second positions and separately actuate injector 82 in response to one or more predetermined conditions. The predetermined conditions may be related to a temperature or pressure signal generated by intake manifold sensor 88 and/or to a signal generated by crank angle sensor 86. It is contemplated that additional engine parameters may be sensed and/or monitored and that CCS 12 may control valve 38 and/or injector 82 based on the additional engine parameters.

Because CCS 12 utilizes a compressed non-combustible gas to cause auto-ignition of the substantially homogeneous fuel and air mixture within combustion chamber 20, only a single fuel system may be required. The single fuel system allows for an inexpensive HCCIE 10, while maintaining the benefits of using a low NOx-producing main fuel.

It will be apparent to those skilled in the art that various modifications and variations can be made to the disclosed HCCIE and CCS. Other embodiments will be apparent to those skilled in the art from consideration of the specification and practice of the disclosed HCCIE and CCS. It is intended that the specification and examples be considered as exemplary only, with a true scope being indicated by the following claims and their equivalents.

What is claimed is:

1. An internal combustion engine, comprising:
    at least one combustion chamber;
    a piston slidably disposed within the at least one combustion chamber and configured to reciprocate between a top-dead-center position and a bottom-dead-center position;
    an air supply in selective fluid communication with the at least one combustion chamber;
    a fuel supply in selective fluid communication with the at least one combustion chamber;
    a supply of non-combustible gas; and
    at least one injector in fluid communication with the at least one combustion chamber and the supply of non-combustible gas, the at least one injector configured to inject an amount non-combustible gas from the supply into the at least one combustion chamber
    wherein the injection of the amount of non-combustible gas into the at least one combustion chamber is adapted to cause auto-ignition of an amount of the fuel supply and the air supply in the at least one combustion chamber.

2. The internal combustion engine of claim 1, wherein the at least one combustion chamber includes a pre-combustion chamber, the injection of non-combustible gas being into the pre-combustion chamber.

3. The internal combustion engine of claim 1, wherein the fuel supply includes a natural gas.

4. The internal combustion engine of claim 1, wherein the fuel supply includes a diesel fuel.

5. The internal combustion engine of claim 1, wherein the supply of non-combustible gas includes air.

6. The internal combustion engine of claim 1, wherein the supply of non-combustible gas includes recirculated exhaust.

7. The internal combustion engine of claim 1, wherein the fuel supply and the air supply are selectively communicated with the at least one combustion chamber when the piston is moving from the top-dead-center position to the bottom-dead-center position during an intake stroke such that a substantially homogeneous fuel and air mixture is formed when the piston is moving from the bottom-dead-center position to the top-dead-center position during a compression stroke, prior to injection of the non-combustible gas.

8. The internal combustion engine of claim 1, wherein the non-combustible gas is injected when the piston is moving from the top-dead-center position to the bottom-dead-center position during a power stroke.

9. The internal combustion engine of claim 1, wherein an amount of the fuel supply and an amount of the air supply are substantially homogeneously mixed together prior to selective communication with the at least one combustion chamber.

10. The internal combustion engine of claim 1, wherein the injection of non-combustible gas facilitates mixing of an amount of the fuel supply and an amount of the air supply within the at least one combustion chamber.

11. The internal combustion engine of claim 1, further including a controller in communication with the at least one injector, the controller being configured to cause injection of the non-combustible gas in response to at least one predetermined condition.

12. The internal combustion engine of claim 11, further including:
   a crankshaft operably connected to the at least one piston and configured to cause the at least one piston to reciprocate in response to a rotation of the crankshaft; and
   a crank angle sensor proximally disposed relative to the crankshaft and configured to generate a signal corresponding to a rotation angle of the crankshaft, wherein the at least one predetermined condition is related to the signal.

13. The internal combustion engine of claim 11, further including at least one sensor associated with the at least one combustion chamber and configured to generate a signal corresponding to at least one of a temperature and a pressure of a fluid entering the at least one combustion chamber, wherein the predetermined condition is related to the signal.

14. The internal combustion engine of claim 1, further including a source of pressure configured to pressurize the supply of non-combustible gas.

15. The internal combustion engine of claim 1, further including a valve configured to regulate a flow of fuel from the supply of fuel into the at least one combustion chamber.

16. A method of operating an internal combustion engine, comprising:
   introducing a quantity of fuel and air into at least one combustion chamber of the internal combustion engine;
   moving a piston between a bottom-dead-center position and a top-dead-center position to compress the quantity of fuel and air; and
   injecting a quantity of non-combustible gas into the at least one combustion chamber to cause auto-ignition of the quantity of fuel and air.

17. The method of claim 16, wherein the at least one combustion chamber includes a pre-combustion chamber, the injection of non-combustible gas being into the pre-combustion chamber.

18. The method of claim 16, wherein the quantity of fuel and air is introduced into the at least one combustion chamber when the piston is moving from the top-dead-center position to the bottom-dead-center position during an intake stroke, such that a substantially homogeneous mixture is formed when the piston is moving from the bottom-dead-center position to the top-dead-center position during a compression stroke, prior to injection of the non-combustible gas.

19. The method of claim 16, further including homogeneously mixing the quantity of fuel and air prior to introduction of the quantity of fuel and air into the at least one combustion chamber.

20. The method of claim 16, wherein the non-combustible gas is injected during a power stroke of the piston.

21. The method of claim 16, wherein the non-combustible gas is injected in response to a predetermined condition.

22. The method of claim 21, further including measuring an angle of a crankshaft operably connected to the piston and generating a signal indicative of the angle, wherein the predetermined condition is related to the signal.

23. The method of claim 21, further including measuring at least one of a temperature and a pressure of a fluid entering the at least one combustion chamber and generating a signal indicative of the measured one of a temperature and a pressure, wherein the predetermined condition is related to the signal.

24. The method of claim 16, wherein the supply of fuel includes a natural gas.

25. The method of claim 16, wherein the supply of fuel includes a diesel fuel.

26. The method of claim 16, wherein the supply of non-combustible gas includes air.

27. The method of claim 16, wherein the supply of non-combustible gas includes recirculated exhaust.

28. The method of claim 16, further including controlling the amount of fuel introduced into the at least one combustion chamber in response to one or more predetermined conditions.

29. The method of claim 16, further including pressurizing the supply of non-combustible gas.

30. The method of claim 1, further including injecting a quantity of non-combustible gas into the at least one combustion chamber to facility mixing of the quantity of fuel and air.

31. A work machine, comprising:
   a traction device;
   an internal combustion engine configured to drive the traction device, the internal combustion engine including:
      at least one combustion chamber;
      a piston slidably disposed within the at least one combustion chamber and configured to reciprocate between a top-dead-center position and a bottom-dead-center position;
      an air supply in selective fluid communication with the at least one combustion chamber;
      a fuel supply in selective fluid communication with the at least one combustion chamber;
      a valve configured to regulate a flow of fuel from the supply of fuel into the at least one combustion chamber;
      a supply of non-combustible gas;
      a source of pressure configured to pressurize the supply of non-combustible gas;
      at least one injector in fluid communication with the at least one combustion chamber and the supply of non-combustible gas, the at least one injector configured to inject an amount of the supply of non-combustible gas into the at least one combustion chamber, wherein the injection of the amount of non-combustible gas into the combustion chamber causes auto-ignition of an amount of the fuel supply and the air supply in the at least one combustion chamber; and
   a controller in communication with the at least one injector, the controller being configured to cause injection of pressurized non-combustible gas in response to at least one predetermined condition.

32. The work machine of claim 31, wherein the fuel supply includes at least one of a natural gas and a diesel fuel.

33. The work machine of claim 31, wherein the supply of non-combustible gas includes at least one of air and recirculated exhaust.

34. The work machine of claim 31, wherein the fuel supply and the air supply are selectively communicated with the at least one combustion chamber when the piston is moving from the top-dead-center position to the bottom-dead-center position during an intake stroke such that a substantially homogeneous fuel and air mixture is formed when the piston is moving from the bottom-dead-center position to the top-dead-center position during a compression stroke, prior to injection of the amount of non-combustible gas.

35. The work machine of claim 31, wherein the non-combustible gas is injected when the piston is moving from the top-dead-center position to the bottom-dead-center position during a power stroke.

36. The work machine of claim 31, wherein an amount of the fuel supply and an amount of the air supply are substantially homogeneously mixed together prior to selective communication with the at least one combustion chamber.

37. The work machine of claim 31, further including:

a crankshaft operably connected to the at least one piston and configured to cause the at least one piston to reciprocate in response to a rotation of the crankshaft; and a crank angle sensor proximally disposed relative to the crankshaft and configured to generate a signal corresponding to a rotation angle of the crankshaft, wherein the at least one predetermined condition is related to the signal.

38. The work machine of claim 31, further including at least one sensor associated with the at least one combustion chamber and configured to generate a signal corresponding to at least one of a temperature and a pressure of a fluid entering the at least one combustion chamber, wherein the predetermined condition is related to the signal.

* * * * *